(12) United States Patent
Rydström et al.

(10) Patent No.: US 12,145,552 B2
(45) Date of Patent: Nov. 19, 2024

(54) SYSTEM AND METHOD FOR USE IN CONNECTION WITH A WHEEL TORQUE GENERATING COMPONENT IN A HEAVY-DUTY VEHICLE

(71) Applicant: Volvo Truck Corporation, Gothenburg (SE)

(72) Inventors: Mats Rydström, Billdal (SE); Fredrik Rahm, Hörby (SE); Tove Audhav, Landvetter (SE); Martin Wilhelmsson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 188 days.

(21) Appl. No.: 18/072,846

(22) Filed: Dec. 1, 2022

(65) Prior Publication Data

US 2023/0182710 A1     Jun. 15, 2023

(30) Foreign Application Priority Data

Dec. 15, 2021   (EP) ..................................... 21214672

(51) Int. Cl.
*B60T 17/00* (2006.01)
*B60L 7/10* (2006.01)
(Continued)

(52) U.S. Cl.
CPC .............. *B60T 17/002* (2013.01); *B60T 5/00* (2013.01); *B60T 8/1701* (2013.01);
(Continued)

(58) Field of Classification Search
CPC ... B60K 11/06; B60L 7/10; B60L 7/28; B60T 5/00; B60T 8/1701; B60T 8/3215;
(Continued)

(56) References Cited

U.S. PATENT DOCUMENTS 9,371,074 B1 *   6/2016   Luehrsen ............... F02D 41/042
12,049,224 B2 *  7/2024   Jin ......................... B60W 20/30
(Continued)

FOREIGN PATENT DOCUMENTS

DE   102020102675 A1 *   8/2020   ............ B60H 1/005
GB   2546262 A          7/2017
(Continued)

OTHER PUBLICATIONS

Extended European Search Report for European Patent Application No. 21214672.4, mailed Aug. 3, 2022, 7 pages.

*Primary Examiner* — Atul Trivedi
(74) *Attorney, Agent, or Firm* — Withrow & Terranova, PLLC

(57) ABSTRACT

A system for use in connection with a wheel torque generating component in a heavy-duty vehicle. The system comprises a fluid conduit, a compressor configured to provide a pressurized air flow through the fluid conduit, a mass flow adding arrangement configured to add a fluid to the pressurized air flow in the fluid conduit, thereby increasing the mass flow of the pressurized air flow, and a flow directing device arranged downstream of the mass flow adding arrangement and configured to direct the pressurized air flow, including the added fluid, from the fluid conduit to the wheel torque generating component so as to control the temperature of the wheel torque generating component. The invention also relates to a method for use in connection with a wheel torque generating component in a heavy-duty vehicle.

19 Claims, 8 Drawing Sheets

(51) Int. Cl.
*B60L 7/28* (2006.01)
*B60T 5/00* (2006.01)
*B60T 8/17* (2006.01)
*B60T 8/32* (2006.01)
*B60T 13/26* (2006.01)
*B60T 13/68* (2006.01)
*B60T 17/02* (2006.01)
*B60T 17/22* (2006.01)
*F16D 65/78* (2006.01)
*F16D 66/00* (2006.01)

(52) U.S. Cl.
CPC ........... *B60T 8/3215* (2013.01); *B60T 13/26* (2013.01); *B60T 13/683* (2013.01); *B60T 17/02* (2013.01); *B60T 17/22* (2013.01); *F16D 65/78* (2013.01); *B60L 7/10* (2013.01); *B60L 7/28* (2013.01); *B60T 2250/00* (2013.01); *B60T 2270/60* (2013.01); *B60T 2270/88* (2013.01); *F16D 2065/782* (2013.01); *F16D 2065/783* (2013.01); *F16D 2066/001* (2013.01)

(58) Field of Classification Search
CPC ........ B60T 13/26; B60T 13/683; B60T 17/00; B60T 17/002; B60T 17/02; B60T 17/22; B60T 2250/00; B60T 2270/60; B60T 2270/88; F16D 65/78; F16D 65/807; F16D 65/827; F16D 65/847; F16D 2065/782; F16D 2065/783; F16D 2066/001
USPC .......................................................... 701/22
See application file for complete search history.

(56) References Cited

U.S. PATENT DOCUMENTS

| | | | | |
|---|---|---|---|---|
| 2002/0148227 | A1* | 10/2002 | Mackay | F02C 6/003 60/39.511 |
| 2006/0272621 | A1* | 12/2006 | Acuna | F02M 35/161 123/542 |
| 2008/0133110 | A1* | 6/2008 | Vetrovec | F02B 37/24 60/600 |
| 2009/0254246 | A1* | 10/2009 | Yang | F04B 35/04 417/415 |
| 2011/0016894 | A1* | 1/2011 | Lemon | B60H 1/3226 29/890.035 |
| 2014/0216398 | A1* | 8/2014 | Cattani | F02D 13/04 123/320 |
| 2016/0222929 | A1* | 8/2016 | Luehrsen | B60T 17/02 |
| 2018/0093655 | A1* | 4/2018 | Healy | B60L 1/003 |
| 2018/0162371 | A1* | 6/2018 | Colavincenzo | B60K 6/387 |
| 2018/0222327 | A1* | 8/2018 | Hosokawa | B60L 58/13 |
| 2018/0257656 | A1* | 9/2018 | Zhao | B60K 6/52 |
| 2019/0270419 | A1* | 9/2019 | Martin | F16D 65/847 |
| 2019/0291665 | A1* | 9/2019 | Martin | B60L 58/12 |
| 2020/0189556 | A1* | 6/2020 | Burt | B60T 17/22 |
| 2020/0231023 | A1* | 7/2020 | Sathasivam | H01M 10/633 |
| 2020/0240424 | A1* | 7/2020 | Vijayakumar | F02B 37/22 |
| 2020/0317061 | A1* | 10/2020 | Oura | H01M 8/04201 |
| 2021/0078585 | A1* | 3/2021 | Collins | B60W 30/045 |
| 2022/0176967 | A1* | 6/2022 | Woodland | B60W 10/18 |
| 2022/0324432 | A1* | 10/2022 | Zhang | B60W 10/02 |
| 2023/0392543 | A1* | 12/2023 | Colavincenzo | B60L 1/02 |

FOREIGN PATENT DOCUMENTS

| | | | |
|---|---|---|---|
| JP | H05215158 A | 8/1993 | |
| WO | WO-2011109013 A1 * | 9/2011 | ............. B60L 11/14 |
| WO | 2020074805 | 4/2020 | |

* cited by examiner

SYSTEM AND METHOD FOR USE IN CONNECTION WITH A WHEEL TORQUE GENERATING COMPONENT IN A HEAVY-DUTY VEHICLE

RELATED APPLICATIONS

The present application claims priority to European Patent Application No. 21214672.4, filed on Dec. 15, 2021, and entitled "SYSTEM AND METHOD FOR USE IN CONNECTION WITH A WHEEL TORQUE GENERATING COMPONENT IN A HEAVY-DUTY VEHICLE," which is incorporated herein by reference in its entirety.

TECHNICAL FIELD

The present disclosure relates to a system for use in connection with a wheel torque generating component in a heavy-duty vehicle. The disclosure also relates to a vehicle comprising such a system. Furthermore, the disclosure relates to a method for use in connection with a wheel torque generating component in a heavy-duty vehicle. The disclosure also relates to a computer program, a computer readable medium and a control unit comprising means for performing the method.

The invention can be applied in heavy-duty vehicles, such as trucks, buses and construction equipment. Although the invention will be described with respect to a truck, the invention is not restricted to this particular vehicle, but may also be used in other heavy-duty vehicles.

BACKGROUND

For heavy-duty vehicles, in particular electric vehicles, braking can be a dimensioning factor for a cooling system of the vehicle, if the vehicle places the energy from braking in the cooling system. This may, for example, be the case when a retarder or a water cooled brake resistor is used. For fuel cell electric vehicles (FCEVs) the cooling capacity of the vehicle is a limiting factor. Having a brake solution that places energy from the braking into the cooling system can make the cooling system even more strained. For battery electric vehicles (BEVs) the cooling demand is lower compared to the FCEV case and they therefore have a smaller cooling system. It can therefore be hard to use braking solutions which place a high amount of energy into the cooling system in a BEV, since the cooling system is not dimensioned for such amounts of energy.

It would be desirable to provide a braking arrangement that has the ability to brake a vehicle without significantly heating up the cooling system and which would therefore be beneficial to heavy-duty vehicles, such as FCEVs and BEVs. In other words it would be desirable to provide an arrangement which can make it possible to reduce the strain on the cooling system of such vehicles. For instance, one way to do this would be to lower the temperature of the brakes. This could, for instance, be done by providing an air flow to the brakes which may then provide some cooling effect.

WO 2020/074805 A1 discloses a system for use in connection with brakes in a landing gear of an aircraft. A compressor generates a pressurized air flow which is guided through a tube. At the end of the tube there are injectors injecting the air to a zone near the brakes. Although such a solution might be implemented for a heavy-duty vehicle such as a truck, there is still room for improvement.

SUMMARY

An object of the invention is to provide a system and a method which at least partly mitigate the above mentioned drawbacks and provides an improvement over the prior art. This and other objects, which will become apparent in the following discussion, are accomplished by a system and a method as defined in the accompanying independent claims. Some non-limiting exemplary embodiments are presented in the dependent claims.

The inventors of the present invention have realized that although providing a pressurized air flow to a brake may to some extent provide some cooling, using a compressor for providing a pressurized air flow to be directed to the brakes comes with a trade-off. On the one hand, a high pressure can create a high flow which may provide better cooling. On the other hand the high pressure comes hand in hand with an increased temperature of the air flow. The inventors have realized that by including a mass flow adding arrangement to increase the mass flow of the pressurized air flow, a high pressure may be provided by the compressor, but the temperature of the pressurized air flow may be reduced. In addition the cooling effect on the brakes will be further increased due to the higher mass of fluid being directed to the brakes.

The inventors have further realized that this general inventive concept of providing a mass flow adding arrangement to a pressurized air flow from a compressor, can be used for controlling the temperature of any other wheel torque generating component, such as for instance an electric machine or motor or an electric eddy current brake. The general inventive concept is thus not limited to controlling the temperature of brakes specifically.

Furthermore, the inventors have realized that the general inventive concept is not even limited to cooling of wheel torque generating components. Indeed the same principle, to increase the mass flow of a pressurized air flow may be used also for heating, the added mass increases the temperature controlling power of the pressurized air flow. For instance, the general inventive concept may advantageously be used for slightly heating frozen brake discs prior to usage, in order to reduce stress.

From the above, it should thus be understood that although the initial problem identified related to brake arrangements that transfer too much heat to cooling systems of a vehicle, it should be understood that the general inventive concept which mitigates that problem may be implemented for general temperature control of any wheel torque generating component in a heavy-duty vehicle. This will now be discussed in more detail with reference to a first aspect of the present disclosure.

According to a first aspect of the present disclosure, there is provided a system for use in connection with a wheel torque generating component in a heavy-duty vehicle, the system comprising:
  a fluid conduit,
  a compressor configured to provide a pressurized air flow through said fluid conduit,
  a mass flow adding arrangement configured to add a fluid to the pressurized air flow in the fluid conduit, thereby increasing the mass flow of the pressurized air flow, and
  a flow directing device arranged downstream of the mass flow adding arrangement and configured to direct the pressurized air flow, including the added fluid, from the fluid conduit to the wheel torque generating component so as to control the temperature of the wheel torque generating component.

By providing the mass flow adding arrangement which allows the mass flow of the pressurized air flow to be increased, a more efficient temperature control of the wheel torque generating component is achievable.

The temperature transferring power to/from the wheel torque generating component is, inter alia, dependent on the temperature of the pressurized air flow, the type of fluid in the flow and the mass flow. The mass flow is a convenient parameter to control, as you can easily control how much extra fluid that should be added to the pressurized air flow.

In case the wheel torque generating component needs to be cooled, the fluid that is added from the mass flow adding arrangement may suitably have a lower temperature than the temperature of the pressurized air flow to which it is added, thereby lowering the temperature of the pressurized air flow. However, it should be understood that this is not necessarily always so, Even if the temperature of the added fluid is the same as the temperature of the pressurized air flow, you gain the benefit of the increased mass flow without needing to drive the compressor at higher speed. Actually, the added fluid might even have a higher temperature than the pressurized air flow. The resulting temperature of the combined flows may in such cases still be lower than the temperature of the wheel torque generating component, thus still resulting in cooling of the wheel torque generating component, and with the benefit of an increased mass flow, the temperature transfer is improved.

Furthermore, the choice of fluid added from the mass flow added arrangement may be appropriately selected. Using air as said added fluid is convenient since it may easily be taken from the environment. Another example is to use water as said added fluid. By adding water to the pressurized air flow a higher specific heat capacity of the combined flow is obtained, which is advantageous for heat transfer (temperature transfer, i.e. improved effect regardless of implementing the invention in a cooling scenario or a heating scenario).

According to at least one exemplary embodiment, the system further comprises:
  a control unit configured to obtain temperature data representative of a determined temperature of the wheel torque generating component, wherein the control unit is configured to, based on the temperature data, selectively control the flow directing device to direct the flow to the wheel torque generating component or in another direction.

By controlling the flow directing device to the wheel torque generating component based on the determined temperature of the wheel torque generating component, the temperature control of the wheel torque generating component can be limited to instances when such control is considered appropriate. In other instances, the pressurized air flow may instead suitably be directed to the ambient or to other components of the vehicle that benefit from such pressurized air flow. Directing the pressurized air flow to the ambient does not necessarily mean that the functionality of the system is wasted. On the contrary, running the compressor may still be advantageous for energy dissipation (braking) purposes, as will be readily understood from another part of this disclosure further below. As regards examples of other components that may benefit from the pressurized air flow may be an electric machine or inverter, if the temperature is low enough. The pressurized air flow could also be used for heat exchanging with the cooling system.

In other exemplary embodiments, the control unit may be configured to obtain temperature data representative of a determined temperature of the wheel torque generating component, wherein the control unit is configured to, based on the temperature data, selectively control the flow directing device to direct the pressurized air flow to the wheel torque generating component, or to turn off the compressor, or to direct the pressurized air flow to the ambient. This may be appropriate in cases in which the pressurized air flow is not intended for any other components.

In a cooling scenario, the control unit may suitably be configured to control the flow directing device to direct the pressurized air flow to the wheel torque generating component as long as the temperature of the pressurized air flow is at a low enough temperature to cool the wheel torque generating component.

The control unit may suitably, in at least some exemplary embodiment, be configured to compare the determined temperature of the wheel torque generating component with one or more predefined limit temperatures. If the determined temperature exceeds a predefined limit temperature (cooling scenario) or falls below a predefined limit temperature (heating scenario), then the control unit may cause the pressurized air flow (with the added fluid) to be directed to the wheel torque generating component.

In other exemplary embodiments, the control unit may predict a scenario in which directing the pressurized air flow to the wheel torque generating component will be appropriate. For instance, the control unit may get information from a navigation system about an upcoming long downhill road segment implying that the service brakes will need to be applied for a prolonged period of time, thus resulting in a raised temperature of the brakes. For such a scenario, the control unit may be configured to start directing the pressurized air flow to the brakes in anticipation of said upcoming downhill road segment.

The temperature of the wheel torque generating component may be determined in different ways. According to at least some exemplary embodiments, the system may comprise a temperature sensor configured to measure a temperature of the wheel torque generating component. This is advantageous since it may provide an accurate determination of the temperature. Thus, the control unit may, from the temperature sensor, receive temperature data representative of the temperature measured by the temperature sensor. According to at least some exemplary embodiments, the temperature of the wheel torque generating component may instead be modelled and/or calculated, which is advantageous since you do not need to install a separate temperature sensor. Such modelling may include data of the ambient temperature, duration of active use of the component, applied force, etc.

According to at least one exemplary embodiment, the control unit is configured to compare a determined temperature of the pressurized air flow with the determined temperature of the wheel torque generating component, wherein said selective control of the control unit is based on the result of the compared determined temperatures.

This is advantageous as the pressurized air flow may be directed to the wheel torque generating component at times when the control unit determines it to be appropriate. For instance, if it is desired to cool down the wheel torque generating component, the control unit may check that the temperature of the pressurized air flow is indeed lower than the temperature of the wheel torque generating component. If not, then the pressurized air flow may suitably be directed to other components of the vehicle. Similarly to above, the temperature of the pressurized air flow may be determined by means of a temperature sensor of by modelling/calculations (e.g. based on the compressor speed, available volume and properties of the added fluid). Furthermore, if the control unit has information about the ambient temperature and compressor operating point it may, based on a compressor map, calculate the expected temperature out of the compressor. The compressor operating point can be derived from the speed of the compressor or the outlet pressure.

According to at least one exemplary embodiment, the control unit is configured to obtain pressure data representative of the pressure of the pressurized air flow, wherein the control unit is configured to, based on the obtained pressure data, control the amount of fluid added by the mass flow adding arrangement. The pressure data may be obtained by means of a pressure sensor and/or by means of modelling/calculations. This may be particularly advantageous in combination with a mass flow adding arrangement having an injection or Venturi function, which would be dependent on the pressure ratio.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

According to at least one exemplary embodiment, the flow directing device comprises a valve. The valve may suitably be used to selectively direct the pressurized air flow to the wheel torque generating component or to a different location. Said different location may, for instance, be the ambient and/or another component (e.g. a motor) of the vehicle. The control unit may thus be configured to control the position of the valve in order to execute such selective directing of the pressurized air flow.

As already explained above, the mass flow adding arrangement may, for instance, be configured to add fluid in the form of air and/or water, each having its advantage. The mass flow adding arrangement may be configured in various ways. Some examples will be given below.

According to at least one exemplary embodiment, the added fluid is air, wherein the mass flow adding arrangement comprises one or more of the following:
 a pump for air injection,
 surrounding channels configured to draw in air,
 a Venturi (or ejector) for air injection.

According to at least one exemplary embodiment, the added fluid is water, wherein the mass flow adding arrangement comprises one or more of the following:
 a pump for water injection,
 a Venturi (or ejector) for water injection.

In exemplary embodiments in which the added fluid is water, the water may suitably come from a water tank. In particular, in the case of the vehicle being a fuel cell electric vehicle, the water may suitably come from a fuel cell water tank. This is at least partly reflected in the following exemplary embodiment.

Thus, according to at least one exemplary embodiment, the mass flow adding arrangement comprises a fuel cell water tank, wherein the fluid added to the pressurized air flow is condensate water collected from the fuel cell water tank. This is advantageous as instead of needing to empty the condensate water tank at regular intervals, the water may be effectively reused for increasing the mass flow of the pressurized air flow, in order to control the temperature of the wheel torque generating component. In some exemplary embodiments that water may be sucked or injected into the pressurized air flow. In some exemplary embodiments the pressurized air flow may be guided through the fuel cell water tank to pick up condensate water.

Adding water may have several advantages. In cooling scenario, the mass flow helps in lowering the temperature of the flow, increasing the mass flow and increase the specific heat capacity of the flow, all of which are positive features when it comes to improving heat transfer. Adding water may also be positive for reducing the number of particles added to the air.

The amount of added water may, in some exemplary embodiments be based on the amount of water that is available to the mass flow adding arrangement. In some exemplary embodiments, it may be based on how much water the pressurized air can take in (e.g. based on humidity and temperature). Thus, the control unit may determine how much water that can be carried by the currently available or an intended/desired pressurized air flow, and control the mass flow adding arrangement (e.g. a pump) to inject the determined amount of water. In some exemplary embodiments, water mass flow injection and compressor speed may be adjusted based on the temperature of the wheel torque generating component (e.g. brake disk temperature), for example to avoid stresses in the said wheel torque generating component. In view of the above, it should be understood that, according to at least some exemplary embodiments, the control unit is configured to obtain temperature data representing the temperature of the pressurized air flow and/or humidity data representing the humidity of the pressurized air flow, wherein the control unit is configured to, based on the obtained temperature data and/or humidity data, control the amount of water added by the mass flow adding arrangement.

According to at least one exemplary embodiment, the system further comprises a motor configured to drive the compressor, the motor being operatively connected to a battery of the vehicle in order to dissipate electric energy from the battery in a controlled manner, thereby enabling new energy generated at a subsequent brake event of the vehicle to be stored in the battery. For instance, in a vehicle having a regenerative brake system in which energy is recovered in a battery as the vehicle slows down, the battery may eventually become fully charged. By connecting a motor to such a battery in order to drive the compressor of the present disclosure, not only is the stored energy effectively reused by powering the compressor to enable the temperature control of the wheel torque generating component as disclosed herein, but additionally the battery will (thanks to the dissipated electric energy) have capacity to store subsequently recovered energy.

As already mentioned previously, the wheel torque generating component may, for example be a brake or an electric machine. Thus, according to at least one exemplary embodiment the wheel torque generating component is a friction brake, such as a disk brake or a drum brake. The pressurized air flow with the increased mass flow may be used for cooling the brake to avoid overheating the brake, but it may also be used to warm up the brake, for example if it is frozen. The electric machine may suitably be used for providing a positive (propulsion) or negative (braking) torque to an individual wheel or to a wheel axle common to a pair of wheels. The temperature of such electric machines may also be controlled by means of directing the pressurized air flow with increased mass flow to each electric machine. The inventive concept may be used for cooling the electric machines in order to avoid overheating and/or for warming up the electric machines when in cold climate.

In at least some exemplary embodiments, said fluid conduit may be provided with a heat exchanger through which a cooling fluid flows for absorbing heat from the pressurized air flow that passes along the heat exchanger, wherein the control unit may be configured to adjust the temperature of the pressurized air flow reaching the flow directing device by controlling the flow of cooling fluid through the heat exchanger. Thus, by providing another control parameter, the temperature control becomes more flexible, allowing different ways to control the temperature of the pressurized air flow.

Other means for affecting the temperature of the pressurized air flow are also conceivable, such as providing in the fluid conduit a resistor or an element having a thermal inertia.

In at least some exemplary embodiments, fluid conduit is provided with a flow restrictor. This is advantageous as it creates higher pressure in the compressor, enabling it to be in a better position in the compressor map. The flow restriction creates a pressure drop.

In at least some exemplary embodiments, the fluid conduit may be provided with a noise reduction component, such as a muffler. The noise reduction component may suitably be provided downstream of the inlet of the added fluid from the mass flow adding arrangement.

According to a second aspect of the present disclosure, there is provided a vehicle comprising a system according to the first aspect, including any embodiment thereof. The advantages of the vehicle of the second aspect are largely analogous to the advantages of the system of the first aspect, including any embodiment thereof.

According to a third aspect of the present disclosure, there is provided a method for use in connection with a wheel torque generating component in a heavy-duty vehicle. The method comprises:
  providing a pressurized air flow through a fluid conduit,
  adding a fluid to the pressurized air flow in the fluid conduit, thereby increasing the mass flow of the pressurized air flow, and
  directing the pressurized air flow, including the added fluid, from the fluid conduit to the wheel torque generating component so as to control the temperature of the wheel torque generating component.

The advantages of the method of the third aspect are largely analogous to the advantages of the system of the first aspect, including any embodiment thereof. Various exemplary embodiments of the method may be implemented by performing the steps performed by the control unit in the above mentioned exemplary embodiments of the system of the first aspect. Some exemplary embodiments are listed below.

According to at least one exemplary embodiment, the method comprises:
  obtaining temperature data representative of a determined temperature of the wheel torque generating component, and
  based on the obtained temperature data, selectively directing the pressurized air flow to the wheel torque generating component or in another direction.

According to at least one exemplary embodiment, the method comprises:
  comparing a determined temperature of the pressurized air flow with the determined temperature of the wheel torque generating component, wherein said selective directing is based on the result of the compared determined temperatures.

According to at least one exemplary embodiment, the method comprises:
  obtaining pressure data representing the pressure of the pressurized air flow, and
  based on the obtained pressure data, controlling the amount of fluid added to the pressurized air flow.

In a general sense, according to at least one exemplary embodiment, the method comprises using the system according to the first aspect, including any embodiment thereof.

According to a fourth aspect of the present disclosure, there is provided a computer program comprising program code means for performing the steps of the method of the third aspect, including any embodiment thereof, when said program is run on a computer. The advantages of the computer program of the fourth aspect are largely analogous to the advantages of the method of the third aspect, including any embodiment thereof.

According to a fifth aspect of the present disclosure, there is provided a computer readable medium carrying a computer program comprising program code means for performing the steps of the method of the third aspect, including any embodiment thereof, when said program product is run on a computer. The advantages of the computer readable medium of the fifth aspect are largely analogous to the advantages of the method of the third aspect, including any embodiment thereof.

According to a sixth aspect of the present disclosure, there is provided a control unit for controlling the temperature of a wheel torque generating component, the control unit being configured to perform the steps of the method of the third aspect, including any embodiment thereof. The advantages of the control unit of the sixth aspect are largely analogous to the advantages of the method of the third aspect, including any embodiment thereof.

Generally, all terms used in the claims are to be interpreted according to their ordinary meaning in the technical field, unless explicitly defined otherwise herein. All references to "a/an/the element, apparatus, component, arrangement, device, means, step, etc." are to be interpreted openly as referring to at least one instance of the element, apparatus, component, arrangement, device, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
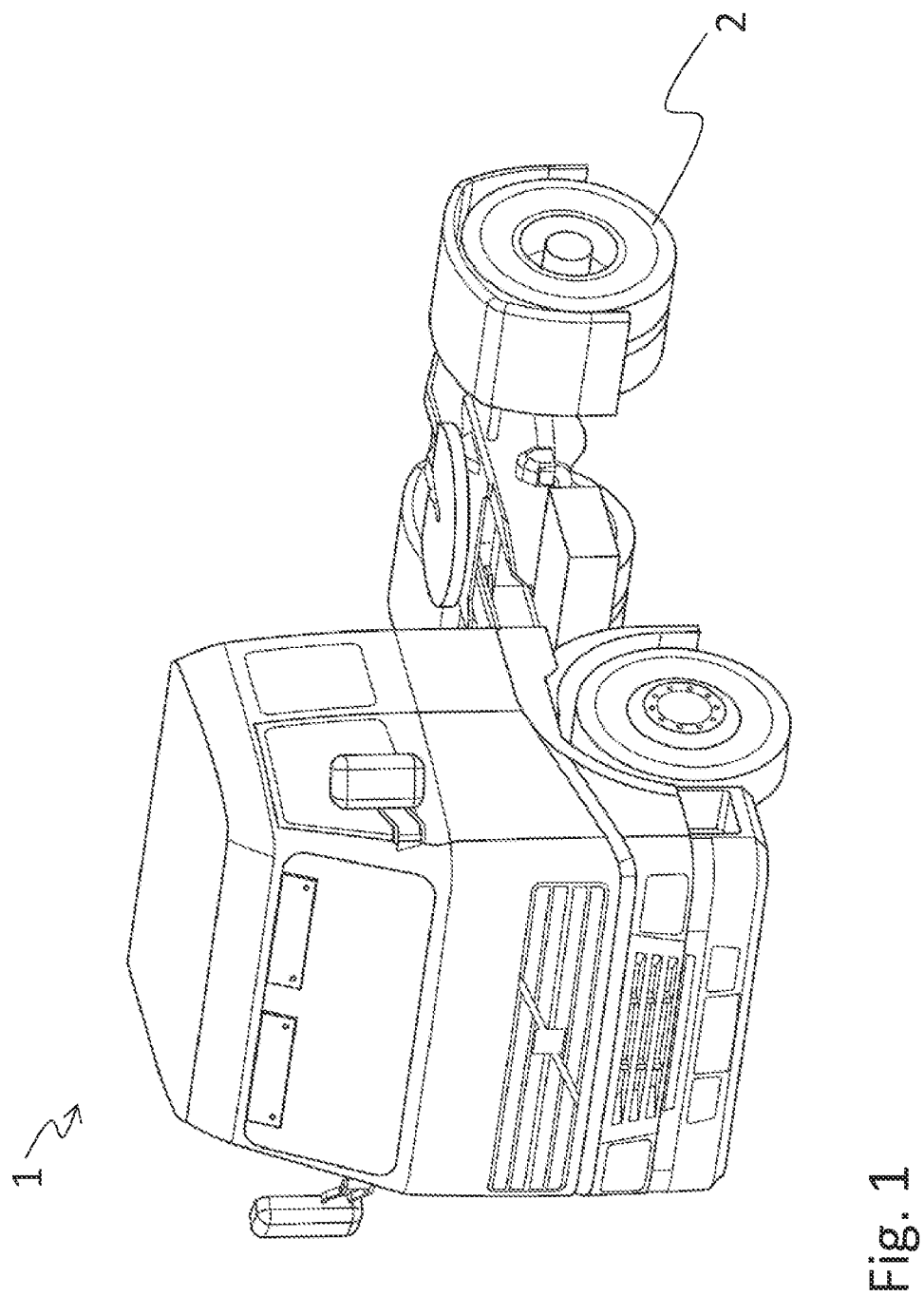
FIG. 1 illustrates a heavy-duty vehicle according to at least one exemplary embodiment of the invention.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 1 according to at least one exemplary embodiment of the invention. The exemplary illustration in FIG. 1 shows a tractor unit for towing a trailer unit (not shown), which together make up a semitrailer vehicle. However, the invention is applicable to other types of vehicles as well. For instance, the vehicle may be a different type of vehicle for cargo transport, such as a truck, or a truck with a dolly unit arranged to tow a trailer unit, etc. The vehicle 1 may be operated by a driver or it may be an autonomous vehicle.

The illustrated vehicle 1 is supported on wheels 2, some of which are driven wheels. Although the vehicle 1 in FIG. 1 only has four wheels 2, the inventive concept is applicable to vehicles having more wheels, such as in the above-mentioned different types of vehicles.

Each wheel 2, or at least a majority of the wheels, is associated with a respective wheel brake, a service brake. This wheel brake may, e.g. be a friction brake, such as a pneumatically actuated disc brake or drum brake, but most aspects of the disclosure are also applicable to regenerative brakes which produce electrical power during vehicle retardation, and electric machines able to slow down wheel rotational velocity upon request. Such electric machines may also be provided to drive one or more wheels for propelling the vehicle 1.

The vehicle 1 may include a system for use in connection with a wheel torque generating component, such as the exemplary embodiments of the system illustrated in FIGS. 2-7, which will now be discussed in more detail.

Figure 2:
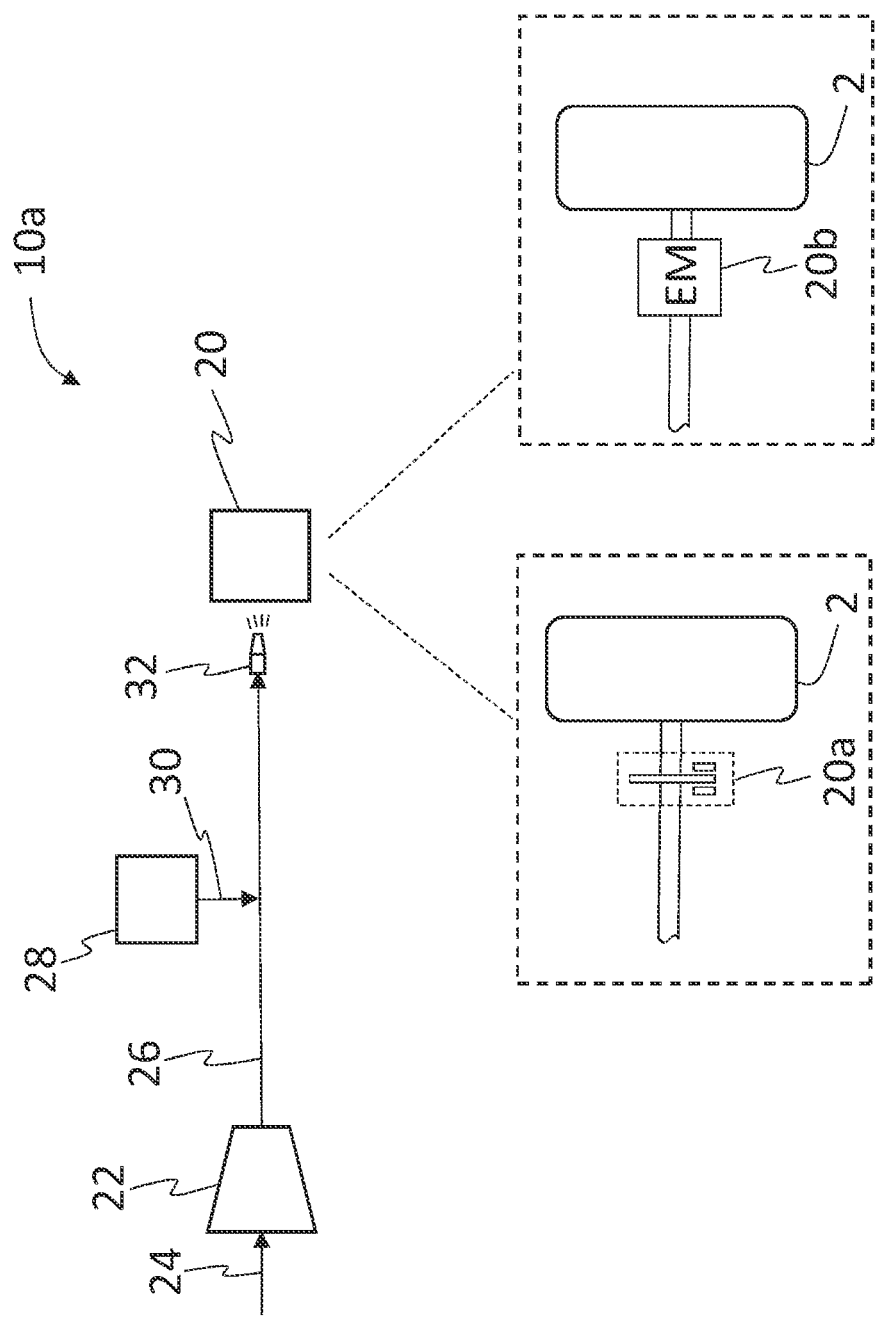
FIGS. 2-7 illustrate schematically different exemplary embodiments of a system of the present disclosure, for use in connection with a wheel torque generating component of a heavy-duty vehicle.

FIG. 2 illustrates schematically a system 10*a* for use in connection with a wheel torque generating component 20 of a heavy-duty vehicle. As illustrated within the dashed rectangles, the wheel torque generating component 20 may, for instance, be a friction brake 20*a* for braking a wheel 2 or an electric machine 20*b* for providing a positive or negative torque to a wheel 2. In at least some exemplary embodiment, reference numeral 20*b* may instead represent an electric eddy current brake.

The system 10*a* comprises a compressor 22, which is configured to receive air 24 from the environment and which is configured to provide a pressurized air flow through a fluid conduit 26. The system 10*a* also comprises a mass flow adding arrangement 28 configured to add a fluid 30 to the pressurized air flow in the fluid conduit 26, thereby increasing the mass flow of the pressurized air flow. Furthermore, the system 10*a* comprises a flow directing device 32, such as including a nozzle at the end of the fluid conduit 26. The flow directing device 32 is thus arranged downstream from the mass flow adding arrangement 28. The flow directing device 32 is configured to direct the pressurized air flow, including the added fluid 30 (which is now mixed with the pressurized air flow in the fluid conduit 26), from the fluid conduit 26 to the wheel torque generating component 20 so as to control the temperature of the wheel torque generating component 20. As has been previously explained, the general inventive concept may be used in cooling scenarios (e.g. to cool a friction brake 20*a* or an electric machine 20*b* to avoid overheating) or in heating scenarios (e.g. to warm-up the friction brake 20*a* or electric machine 20*b* when starting in cold climate conditions). The added fluid 30 from the mass flow adding arrangement 28 increases the mass flow of the pressurized air flow and thus the power of the flow (cooling power or heating power).

As already explained previously in this disclosure, said fluid 30, when added from the mass flow adding arrangement 28, may have a lower temperature than the pressurized air flow in the fluid conduit 26 to which it is added, thereby lowering the temperature of the pressurized air flow. The added fluid 30 may, for instance, be ambient air which is pumped or injected into the pressurized air flow. The air 24 received and compressed by the compressor 22 may also be ambient air, however, due to the pressurization the temperature of the air exiting the compressor 22 will be raised compared to the temperature of the air 24 entering the compressor 22. In other exemplary embodiments, however, the added fluid 30 may have a higher or the same temperature as the pressurized air flow. As explained above, the added fluid 30 may be air, but another possibility is to use water as said fluid 30 added from the mass flow adding arrangement 28.

Figure 3:
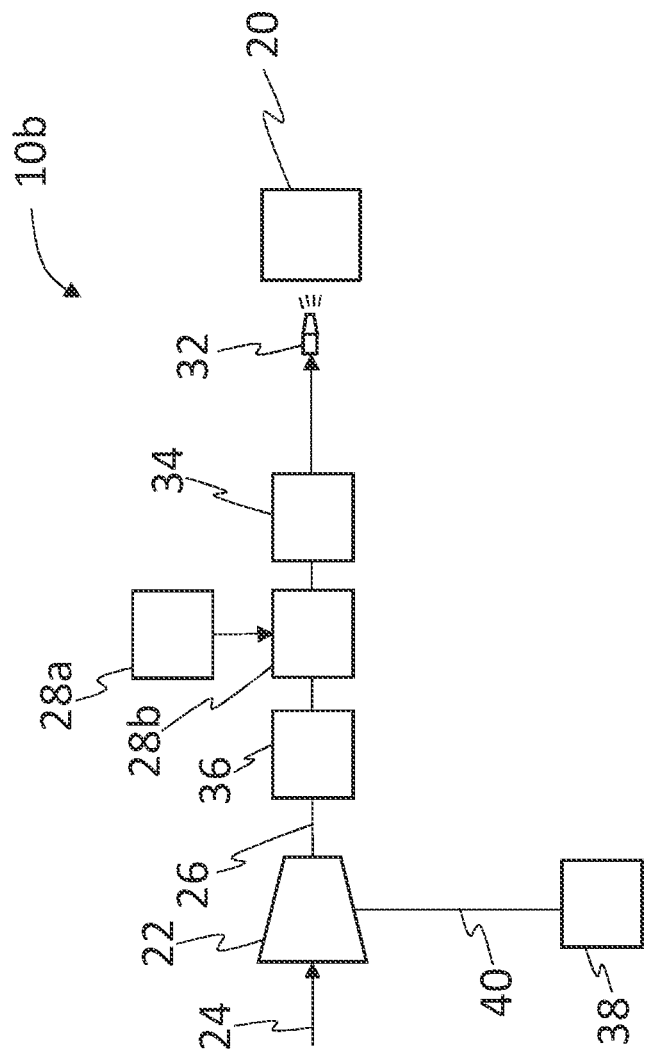

FIG. 3 illustrates schematically a system 10*b* according to at least one other exemplary embodiment of the present disclosure. The mass flow adding arrangement may, for example comprise a pump 28*a*, Venturi, surrounding channels etc. for displacing the fluid to an injector 28*b* which injects the fluid into the fluid conduit 26 where the added fluid is mixed with the pressurized air flow. The system 10*b* may also comprise a muffler 34 to reduce noise in the fluid conduit 26, the muffler 34 suitably being provided downstream of the injection of the added fluid. Furthermore, the system may comprise a heat exchanger 36, restrictor or some other component with thermal inertia for controlling the temperature of the pressurized air flow, and may suitably be arranged upstream of the injection of the added fluid. The system 10*b* may further comprise a motor 38 configured to drive the compressor 22 via a shaft 40. The motor 38 may be operatively connected to a battery (not shown) of the vehicle in order to dissipate electric energy from the battery in a controlled manner, thereby enabling new energy generated at a subsequent brake event of the vehicle to be stored in the battery. It should be understood that in alternative exemplary embodiments the system 10*b* does not need to include each of the components added in FIG. 3 in comparison to FIG. 2. For instance, in some exemplary embodiments, the motor 38 for dissipating energy depicted in FIG. 3 may be incorporated in the system 10*a* illustrated in FIG. 2, without adding other components (e.g. heat exchanger and/or muffler).

Figure 4:
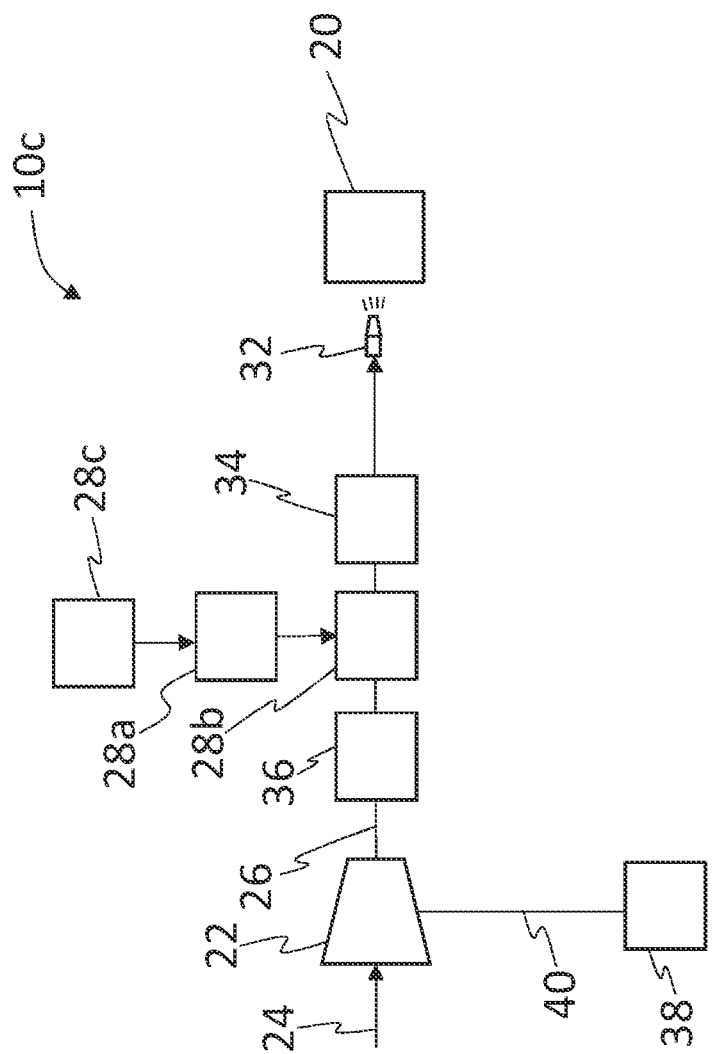

FIG. 4 illustrates schematically a system 10*c* according to at least one other exemplary embodiment of the present disclosure. In addition to the components provided in FIG.

3, the mass flow adding arrangement also comprises a fuel cell water tank 28c. The fluid added to the pressurized air flow is in this case condensate water collected from the fuel cell water tank 28c of a fuel cell electric vehicle (FCEV). It should, however, be understood that other water reservoirs than a fuel cell water tank are also conceivable.

Figure 5:
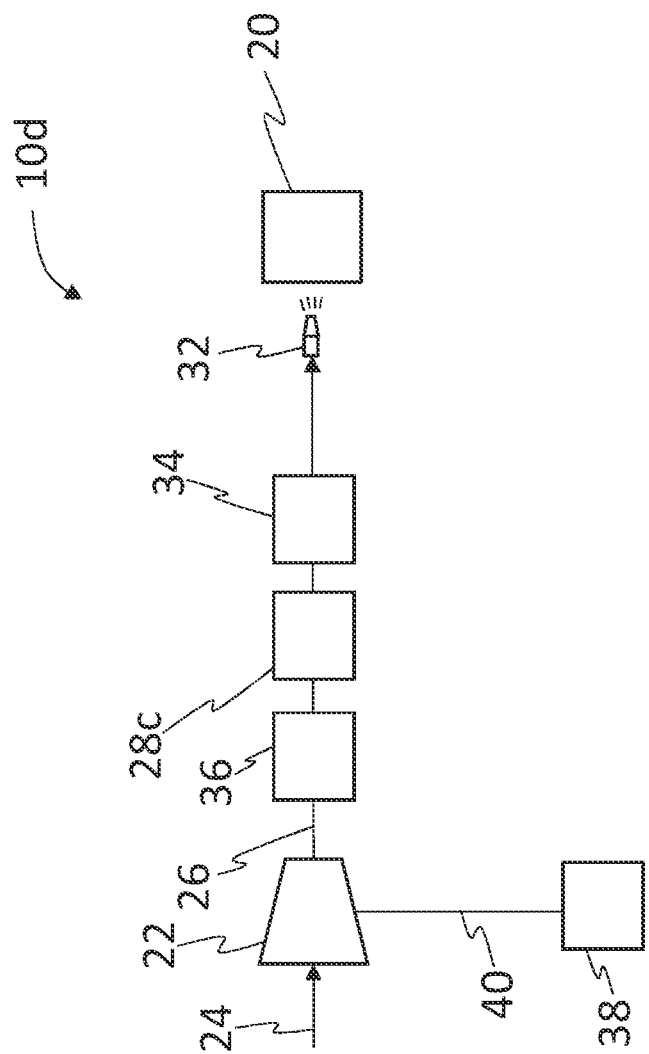

FIG. 5 illustrates schematically a system 10d according to at least one other exemplary embodiment of the present disclosure. In this exemplary embodiment the pressurized air flow is led through a water reservoir (i.e. mass flow adding arrangement). The water reservoir may, for instance, be a fuel cell water tank 28c. The fuel cell water tank 28c will work as a humidifier of the air. Suitably the temperature of the air flowing through the fuel cell water tank 28c is controlled so that it is not too hot, which would risk igniting any small amount of hydrogen which may have entered the fuel cell water tank 28c.

Figure 6:
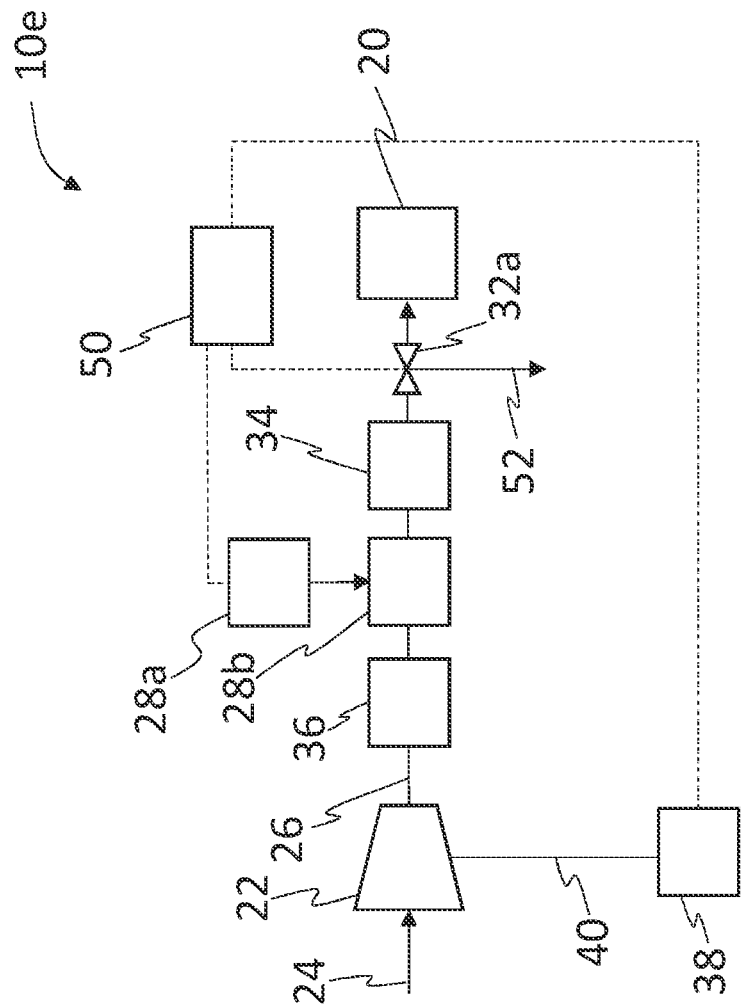

FIG. 6 illustrates schematically a system 10e according to at least one other exemplary embodiment. In this exemplary embodiment, the flow directing device comprises a valve 32a. The valve 32a may in some exemplary embodiments be an on/off valve, or in some exemplary embodiments it may be a three-way valve as illustrated in FIG. 6. Such valves may be incorporated in any one of the other discussed exemplary embodiments. Although not illustrated in FIG. 6, the flow directing device may suitably also include a nozzle as illustrated in the previous figures. The system 10e also comprises a control unit 50 for controlling the valve 32a (as illustrated by the dashed connecting line). The control unit 50 may thus be configured to control the valve 32a to direct the pressurized air flow towards the wheel torque generating component 20 (e.g. via a nozzle) or to a different location 52. Such a different location 52 may, for instance, be the ambient or another component that may benefit from the pressurized air flow (at times when the temperature of the wheel torque generating component 20 is satisfactory).

The control unit 50 may be configured to obtain temperature data representative of a determined temperature of the wheel torque generating component 20. Such temperature data may, for instance, be obtained through modelling or from one or more temperature sensors (not shown). The control unit 50 may, based on the obtained temperature data, selectively control the flow directing device (in this case the valve 32a) to direct the flow to the wheel toque generating component 20 or in another direction to said different location 52. Thus, if the control unit 50 determines that the temperature of the wheel torque generating component 20 is such that it would benefit from receiving the pressurized air flow (e.g. the wheel torque generating component 20 has too high temperature and needs to be cooled down), then it will control the valve 32a accordingly. Otherwise, it may control the valve 32a to direct the pressurized air flow to said other location 52.

The control unit 50 may also be configured to compare a determined temperature of the pressurized air flow (e.g. determined by modelling or by one or more temperature sensors) with the determined temperature of the wheel torque generating component 20. Based on the result of the compared determined temperatures, the control unit 50 may control the valve 32a. For instance, if the temperature difference is too large the control unit 50 may, in some cases, be configured to control the valve 32a to direct the flow to said other location 52.

The control unit 50 may also be configured to obtain pressure data representing the pressure of the pressurized air flow (e.g. by modelling or by one or more pressure sensors). The control unit 50 may be configured to, based on the obtained pressure data, control the amount of fluid added by the mass flow adding arrangement 28a, 28b. Furthermore, as illustrated in FIG. 6 the control unit 50 may also control the motor 38 in order to control the amount of energy that is to be dissipated from the battery and/or to control the speed of the compressor 22 and thus the pressure of the pressurized air flow. The control unit 50 may also be configured to control other components, such as the amount of coolant passing through a heat exchanger 36 provided at the fluid conduit 26.

It should be understood that a control unit 50 such as the one exemplified in FIG. 6 may, of course, be provided in other exemplary embodiments as well, such as in the exemplary embodiments illustrated in the other drawing figures, for corresponding or similar control actions.

Figure 7:
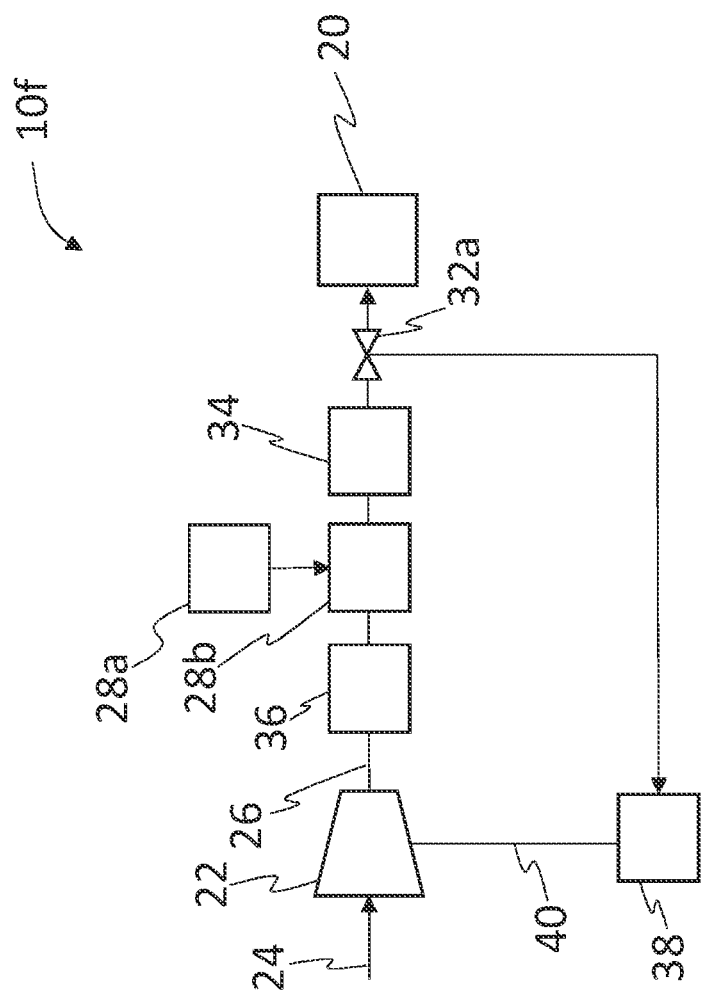

FIG. 7 illustrates schematically a system 10f according to at least one other exemplary embodiment. In this exemplary embodiment, said other location (reference numeral 52 in FIG. 6) to which the pressurized air flow can be directed is the motor 38 which drives the compressor 22. Thus, the motor 38 can be cooled down (to avoid overheating) and/or warmed-up (when starting in cold climate conditions).

Each one of the exemplary embodiments of FIG. 2-7 illustrate that a mass flow adding arrangement 28, 28a, 28b, 28c is provided which adds fluid to the pressurized air flow with which it is mixed. By this arrangement, the mass flow of the pressurized air flow is increased, and consequently the heating or cooling power of the air blown over the wheel torque generating component 20 is improved. Furthermore, the temperature of the pressurized air flow may also be affected by the temperature of the added fluid. For example, in case of a cooling scenario, assuming that it has been determined (e.g. by a control unit 50) that the wheel torque generating component 20 should be cooled down, then the added fluid 30 may decrease the temperature of the pressurized air flow (the pressurization increases the temperature of the air 24 received by the compressor 22) in addition to providing increased mass flow to the pressurized air flow. Thus, a synergistic cooling effect is achieved in such a scenario. In addition, for water injection (i.e. in embodiments in which the added fluid is water) and in case of evaporation, the temperature will be further decreased due to the evaporation heat adding to the cooling effect.

Figure 8:
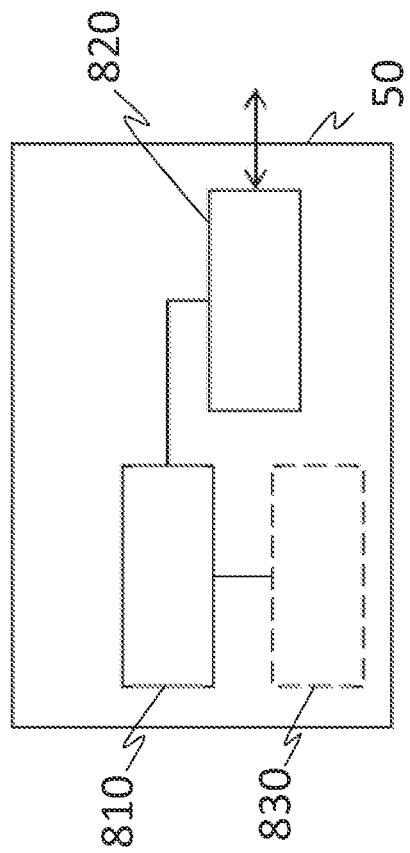
FIG. 8 schematically illustrates a control unit according to at least one exemplary embodiment of the invention.

FIG. 8 schematically illustrates a control unit 50 according to at least one exemplary embodiment of the invention. In particular, FIG. 8 illustrates, in terms of a number of functional units, the components of a control unit 50 according to exemplary embodiments of the discussions herein. The control unit 50 may be comprised in systems 10a. 10b, 10c. 10d. 10e, 10f such as those illustrated in FIGS. 2-7 and/or in a vehicle 1 such as the one exemplified in FIG. 1. Processing circuitry 810 may be provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 50 to perform a set of operations, or steps, such as the method that will be discussed below in connection to FIG. 10. For example, the storage medium 830 may store the set of operations, and the processing circuitry 810 may be configured to retrieve the set of operations from the storage medium 830 to cause the control unit 50 to perform the set of operations. The set of operations may be provided as a set of executable instructions. Thus, the processing circuitry 810 is thereby arranged to execute exemplary methods as herein disclosed.

The storage medium 830 may also comprise persistent storage, which, for example may be any single one or combination of magnetic memory, optical memory, solid state memory or even remotely mounted memory.

The control unit may 50 further comprise an interface 820 for communications with at least one external device such as a motor driving the compressor, a mass flow adding arrangement, a valve for directing pressurized air flow, temperature and/or pressure sensors, etc., As such, the interface 820 may comprise one or more transmitters and receivers, comprising analogue and digital components and a suitable number of ports for wireline or wireless communication.

The processing circuitry 810 controls the general operation of the control unit 50, e.g. by sending data and control signals to the interface 820 and the storage medium 830, by receiving data and reports from the interface 820, and by retrieving data and instructions form the storage medium 830. Other components, as well as the related functionality, of the control unit 50 are omitted in order not to obscure the concepts presented herein.

Figure 9:
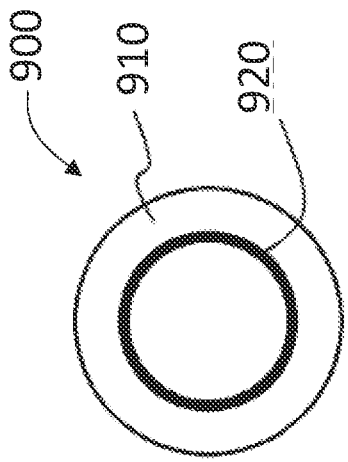
FIG. 9 schematically illustrates a computer program product according to at least one exemplary embodiment of the invention.

FIG. 9 schematically illustrates a computer program product 900 according to at least one exemplary embodiment of the invention. More specifically, FIG. 9 illustrates a computer readable medium 910 carrying a computer program comprising program code means 920 for performing the methods exemplified in FIG. 10, when said program product is run on a computer. The computer readable medium 910 and the program code means 920 may together form the computer program product 900.

Figure 10:
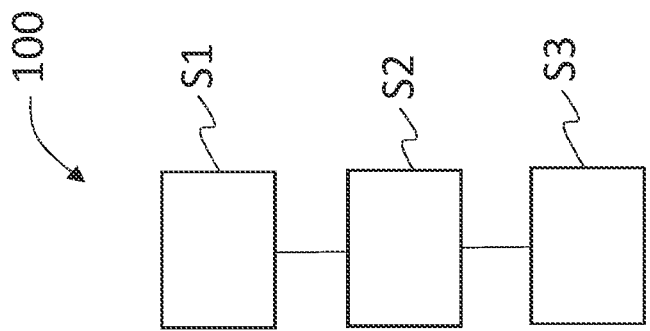
FIG. 10 schematically illustrates a method according to an exemplary embodiment of the invention.

FIG. 10 schematically illustrates an exemplary embodiment of a method 100 for use in connection with a wheel torque generating component in a heavy-duty vehicle. The method 100 comprises:

in a step S1, providing a pressurized air flow through a fluid conduit, in a step S2, adding a fluid to the pressurized air flow in the fluid conduit, thereby increasing the mass flow of the pressurized air flow, and in a step S3, directing the pressurized air flow, including the added fluid, from the fluid conduit to the wheel torque generating component so as to control the temperature of the wheel torque generating component.

The method 100 may suitably be implemented for the system of the present disclosure, including any exemplary embodiment thereof. For instance, the method 100 may be implemented for the exemplary embodiments discussed in connection with FIGS. 2-7.

The invention claimed is:

1. A system for use in connection with a wheel torque generating component in a heavy-duty vehicle, comprising:
a fluid conduit arranged to receive a pressurized air flow,
a compressor configured to provide the pressurized air flow through the fluid conduit,
a mass flow adding arrangement configured to add a fluid to the pressurized air flow in the fluid conduit, thereby increasing a mass flow of the pressurized air flow, and
a flow directing device arranged downstream from the mass flow adding arrangement and configured to direct the pressurized air flow, including the added fluid, from the fluid conduit to the wheel torque generating component so as to control a temperature of the wheel torque generating component.

2. The system of claim 1, wherein the fluid, when added from the mass flow adding arrangement, has a lower temperature than the pressurized air flow to which the fluid is added, thereby lowering a temperature of the pressurized air flow.

3. The system of claim 1, further comprising:
a control unit configured to obtain temperature data representative of a determined temperature of the wheel torque generating component, wherein the control unit is configured to, based on the obtained temperature data, selectively control the flow directing device to direct the pressurized air flow to the wheel torque generating component or in another direction.

4. The system of claim 3, wherein the control unit is configured to compare a determined temperature of the pressurized air flow with the determined temperature of the wheel torque generating component, wherein the selective control of the control unit is based on the result of the compared determined temperatures.

5. The system of claim 3, wherein the control unit is configured to obtain pressure data representing a pressure of the pressurized air flow, wherein the control unit is configured to, based on the obtained pressure data, control an amount of fluid added by the mass flow adding arrangement.

6. The system of claim 1, wherein the flow directing device comprises a valve.

7. The system of claim 1, wherein the added fluid is air, wherein the mass flow adding arrangement comprises one or more of the following:
a pump for air injection,
surrounding channels configured to draw in air, and/or
a Venturi for air injection.

8. The system of claim 1, wherein the added fluid is water, wherein the mass flow adding arrangement comprises one or more of the following:
a pump for water injection, and/or
a Venturi for water injection.

9. The system of claim 8, wherein the mass flow adding arrangement comprises a fuel cell water tank, wherein the fluid added to the pressurized air flow is condensate water collected from the fuel cell water tank.

10. The system of claim 8, wherein the control unit is configured to obtain temperature data representing a temperature of the pressurized air flow and/or humidity data representing a humidity of the pressurized air flow, wherein the control unit is configured to, based on the obtained temperature data and/or humidity data, control an amount of water added by the mass flow adding arrangement.

11. The system of claim 1, further comprising a motor configured to drive the compressor, the motor being operatively connected to a battery of the heavy-duty vehicle in order to dissipate electric energy from the battery in a controlled manner, thereby enabling new energy generated at a subsequent brake event of the heavy-duty vehicle to be stored in the battery.

12. The system of claim 1, wherein the wheel torque generating component is a friction brake, a disk brake, or a drum brake.

13. The system of claim 1, wherein the wheel torque generating component is an electric machine or an electric eddy current brake.

14. A vehicle comprising the system of claim 1.

15. A method for use in connection with a wheel torque generating component in a heavy-duty vehicle, comprising:
providing a pressurized air flow through a fluid conduit, adding a fluid to the pressurized air flow in the fluid conduit, thereby increasing a mass flow of the pressurized air flow, and directing the pressurized air flow, including the added fluid, from the fluid conduit to the wheel torque generating component so as to control a temperature of the wheel torque generating component.

16. The method of claim 15, comprising using a system for use in connection with a wheel torque generating component in a heavy-duty vehicle, comprising:

a fluid conduit arranged to receive a pressurized air flow, a compressor configured to provide the pressurized air flow through the fluid conduit, a mass flow adding arrangement configured to add a fluid to the pressurized air flow in the fluid conduit, thereby increasing the mass flow of the pressurized air flow, and a flow directing device arranged downstream from the mass flow adding arrangement and configured to direct the pressurized air flow, including the added fluid, from the fluid conduit to the wheel torque generating component so as to control the temperature of the wheel torque generating component.

17. A computer program comprising program code means for performing the steps of the method of claim 15 when the program is run on a computer.

18. A computer readable medium carrying a computer program comprising program code means for performing the steps of the method of claim 15 when the program product is run on a computer.

19. A control unit for controlling the temperature of a wheel torque generating component, the control unit being configured to perform the steps of the method of claim 15.

* * * * *